(12) United States Patent
Scarpello, Jr. et al.

(10) Patent No.: US 7,711,980 B1
(45) Date of Patent: May 4, 2010

(54) COMPUTER SYSTEM FAILURE MANAGEMENT WITH TOPOLOGY-BASED FAILURE IMPACT DETERMINATIONS

(75) Inventors: Samuel L. Scarpello, Jr., Omaha, NE (US); Erik C. Colnick, Longmont, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 366 days.

(21) Appl. No.: 11/751,789

(22) Filed: May 22, 2007

(51) Int. Cl.
*G06F 11/00* (2006.01)

(52) U.S. Cl. .......................................... 714/4; 714/10
(58) Field of Classification Search ................ None
See application file for complete search history.

(56) References Cited

U.S. PATENT DOCUMENTS

| | | | |
|---|---|---|---|
| 5,005,122 A | 4/1991 | Griffin et al. | |
| 5,710,885 A | 1/1998 | Bondi | |
| 5,946,373 A | 8/1999 | Harris | |
| 6,026,077 A | 2/2000 | Iwata | |
| 6,154,849 A * | 11/2000 | Xia | 714/4 |
| 7,228,453 B2 * | 6/2007 | O'Brien et al. | 714/13 |
| 7,287,180 B1 * | 10/2007 | Chen et al. | 714/4 |
| 7,370,223 B2 * | 5/2008 | Olmstead et al. | 714/4 |
| 7,412,479 B2 * | 8/2008 | Arendt et al. | 709/200 |
| 7,464,159 B2 * | 12/2008 | Di Luoffo et al. | 709/224 |
| 2005/0268151 A1 * | 12/2005 | Hunt et al. | 714/4 |
| 2005/0268156 A1 * | 12/2005 | Mashayekhi et al. | 714/4 |

* cited by examiner

*Primary Examiner*—Michael C Maskulinski

(57) ABSTRACT

The present invention provides for indicating devices that are impacted by the failures of another device. Then when allocating workloads to devices, non-impacted devices are given priority over impacted devices as allocation targets for workloads.

16 Claims, 4 Drawing Sheets

US 7,711,980 B1

COMPUTER SYSTEM FAILURE MANAGEMENT WITH TOPOLOGY-BASED FAILURE IMPACT DETERMINATIONS

BACKGROUND

As an alternative to purchasing computer systems, a user can lease portions of a massive computer system, much as a traveler might lease a hotel room or an event planner might lease a hotel-dining hall. This business model, introduced by Hewlett-Packard Company as a "Utility Data Center" ("UDC"), allows flexible access to computer resources without the burden of maintaining a computer system.

Of course, the owner of the computer system must maintain it. Not only must the owner of the computer system provide maintenance, but do so in a way that ensures that contractual obligations are met. Since failures are inevitable in a large system, provisions must be made to move a user's workload to working hardware that meets user specification.

Computer system maintenance can be automated to a large extent. An automated workload manager can test for or otherwise detect failures. For example, the workload manager can send out requests and check for responses. If a device does not respond, it may have failed or it may be inaccessible due to failure of another device (e.g., a server may be inaccessible because a switch port to which it is connected has failed.) In either case, a failure can be noted, e.g., in a device database.

If possible, workload on a failed device can be migrated to an available device. In any event, a failed device will not be targeted for installation of a new workload or the target of a software migration. In due course, hardware or replacement of devices marked "failed" can obviate the failure.

Herein, related art is described to facilitate understanding of the invention. Related art labeled "prior art" is admitted prior art; related art not labeled "prior art" is not admitted prior art.

BRIEF DESCRIPTION OF THE DRAWING

The figure depicts implementations/embodiments of the invention and not the invention itself.

DETAILED DESCRIPTION

In the course of the present invention, it was recognized that, while distinguishing between failed and available devices suffices to maintain the functionality of a system, further distinctions are required for manageability purposes. For example, if a terminal server used for managing other servers, fails, the managed servers may continue functioning. However, the ability to reconfigure the managed servers will have been lost or impaired. This loss or impairment should be taken into account when a need arises to reconfigure a system; for example, an administrator should not try to migrate a workload to a device with no or impaired manageability.

Figure 1:
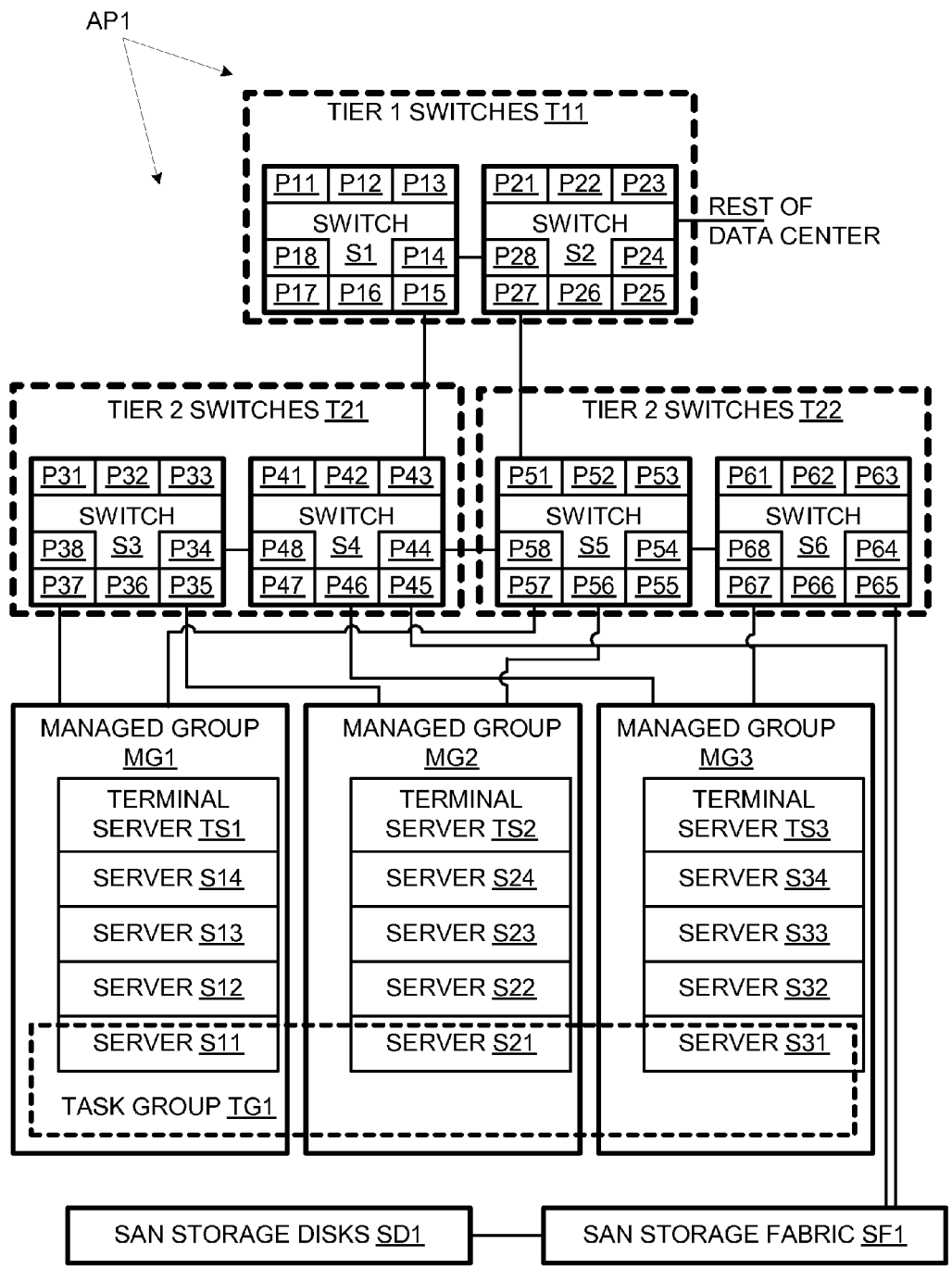
FIG. 1 is a schematic diagram of a managed computer system in accordance with an embodiment of the invention.

FIG. 1 depicts a customer-leased portion of a vendor-operated data center AP1, which includes managed server groups MG1-3, storage-array network (SAN) disks SD1, SAN storage fabric SF1, first tier switches T11, and two groups of second tier switches T21 and T22. First tier switches T11 includes switch 51 and switch S2; second tier switches T21 includes switches S3 and S4, and second tier switches T22 includes switches S5 and S6. Each of these switches S1-S6 is shown with eight ports, P11-P18, P21-P28, P31-P38, P41-P48, P51-P58, and P61-P68. Typically, there would be more, e.g., twenty-four, ports per switch.

Managed group MG1 includes a terminal server TS1 and customer-leased servers S11-S14. Managed group MG2 includes a terminal server TS2 and customer-leased servers S21-S24. Managed group MG1 includes a terminal server TS3 and customer-leased servers S31-S34. For each managed group, MG1, MG2, and MG3, the terminal server TS1, TS2, and TS3, is used to manage the customer-leased servers S11-S14, S21-S24, and S31-S34. The grouping of servers into managed groups is invisible to the customer. The customer can group servers into task groups independent of the membership in managed groups. For example, serves S11, S21, and S31 are arranged into a customer task group TG1.

If a customer-leased server fails, it will be marked "failed" in a change database. Generally, a new server will be added to the customer's pool and the workload on the failed server will be migrated to the new server or another server of the customer's if possible. Thus, if server S11 fails, its workload can be migrated to server S22. Server S11 will be repaired or replaced as a maintenance schedule permits. It may or may not be returned to its role for its former lessee.

If a terminal server fails, the ability to manage the customer-leased servers in the group is lost or compromised. For example, if terminal server TS1 fails, servers S11-S14 can become unmanageable. They may, however, continue functioning. In this case, terminal server TS1 is marked "failed", while servers S11-S14 are marked "impacted" or "partially failed" in view of their functional dependencies from failed terminal server TS1. The "impacted" marking can be supplemented with a comment or other indication of why they are so marked.

The "impacted" indication does not require an immediate workload migration in all situations. However, contractual terms might require migration from an impacted machine. On the other hand, in addition, physical repair or replacement of an impacted device is usually not required. On the other hand, due to loss of manageability, an impacted server would not be a good migration target. Marking an impacted server as such could serve as a warning to an allocation planner (whether human or automated) that the migration is not possible due to lack of manageability or, if possible, not desirable, due to lack of manageability.

Thus, expanding a change database to provide for "impacted" devices to be distinguished from "available" and "failed" devices, facilitates data center management by 1) preventing un-implementable reallocation plans from being generated; 2) avoiding migrations to less desirable locations; and 3) avoiding attempts to repair devices that are not really damaged.

For another scenario, consider the case where port P37 provides the only connection to terminal server TS1. If port P37 fails, it is marked "failed". However, terminal server TS1 becomes disconnected from the rest of data center AP1, and thus is non-functional. A manager program can detect failures of both port P37 and terminal server TS1. In view of a connection dependency of terminal server TS1 on port P37, it can be determined that the inaccessibility of terminal server TS1 may be due to the failure of port P37, rather than any actual problem with terminal server TS1. Thus, the problem with port P37 might be repaired or an alternative connection might be provided before an attempt to repair or replace terminal server TS1 is made.

In this scenario, terminal server TS1 is marked "impacted" with a comment indicating that it is inaccessible. Also, devices dependent on a failed or impacted device are marked. Thus, servers S11-S14 are marked impacted in view of their functional dependency on terminal server TS1.

Also in this scenario in which port P37 fails, incorporating switch S3 is marked "impacted" because of its inclusion relationship with failed port P37. This indication is used to discourage allocation to devices directly serviced by switch S3, because it is partially defective and because a failure of one port may presage other ports failing on the same switch. Future allocation should marginalize the role of switch S3 so that it can be replaced with minimal interference of devices in data center AP1.

In practice, a data center is designed with many redundant connections. For example, terminal server TS1 would likely have two network connections, e.g., one connected to port P37 and another connected to port P57. A failure of either one of the ports would not render terminal server TS1 inaccessible, but would increase the risk of its being rendered inaccessible. For example, if port P37 fails, redundancy is lost and only one more port needs to fail for terminal server TS1 to become inaccessible.

If one of two redundant connections to terminal server TS1 fails, the terminal server remains accessible. Nonetheless, it is marked "impacted" in view of its connection dependency on a failed device. Also, servers S11-S14 are marked "impacted" in view of their functional dependencies on an impacted terminal server. This marking is appropriate even though servers S11-S14 remain functional and manageable, as they are at increased risk of becoming unmanageable. A workload manager should be discouraged from migrating workloads to those servers. Of course, if better choices are not available, impacted servers can still be migration targets. For this reason, intelligent commenting can permit the person or program doing the allocation to weigh allocation choices.

Figure 2:
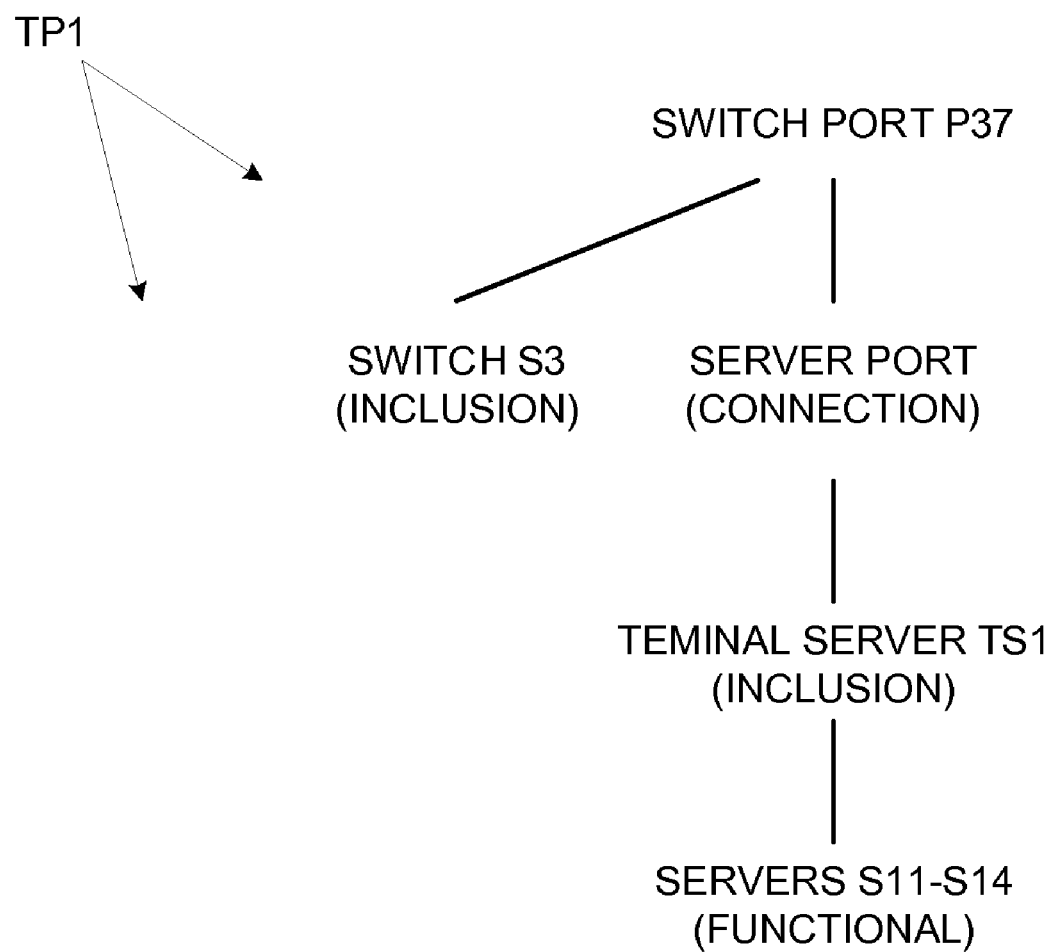
FIG. 2 is a portion of a topology corresponding to the computer system of FIG. 1.

FIG. 2 shows a portion of a topology TP1 generated to facilitate identification of indirect (intergenerational) dependency relationships. In the illustrated topology portion, the top item is switch port P37. Switch S3 has an inclusion dependency relationship on switch port P37. No device depends directly on switch S3. In addition, a server port (network interface card) of terminal server TS1 has a connection dependency on port P37. Terminal server TS1 has an inclusion dependency on this server port. Servers S11-S14 are managed by terminal server TS1, and thus have (non-inclusion, non-connection) functional dependencies on terminal serve TS1. Note that it is immediately apparent that servers S11-S14 will be impacted by a failure of switch port P37.

The invention applies to devices other than switches and servers. For example, failures in SAN storage fabric SF1 can impact storage disks SD1. Other examples are described with reference to FIG. 3, which depicts another portion of data center AP1.

Figure 3:
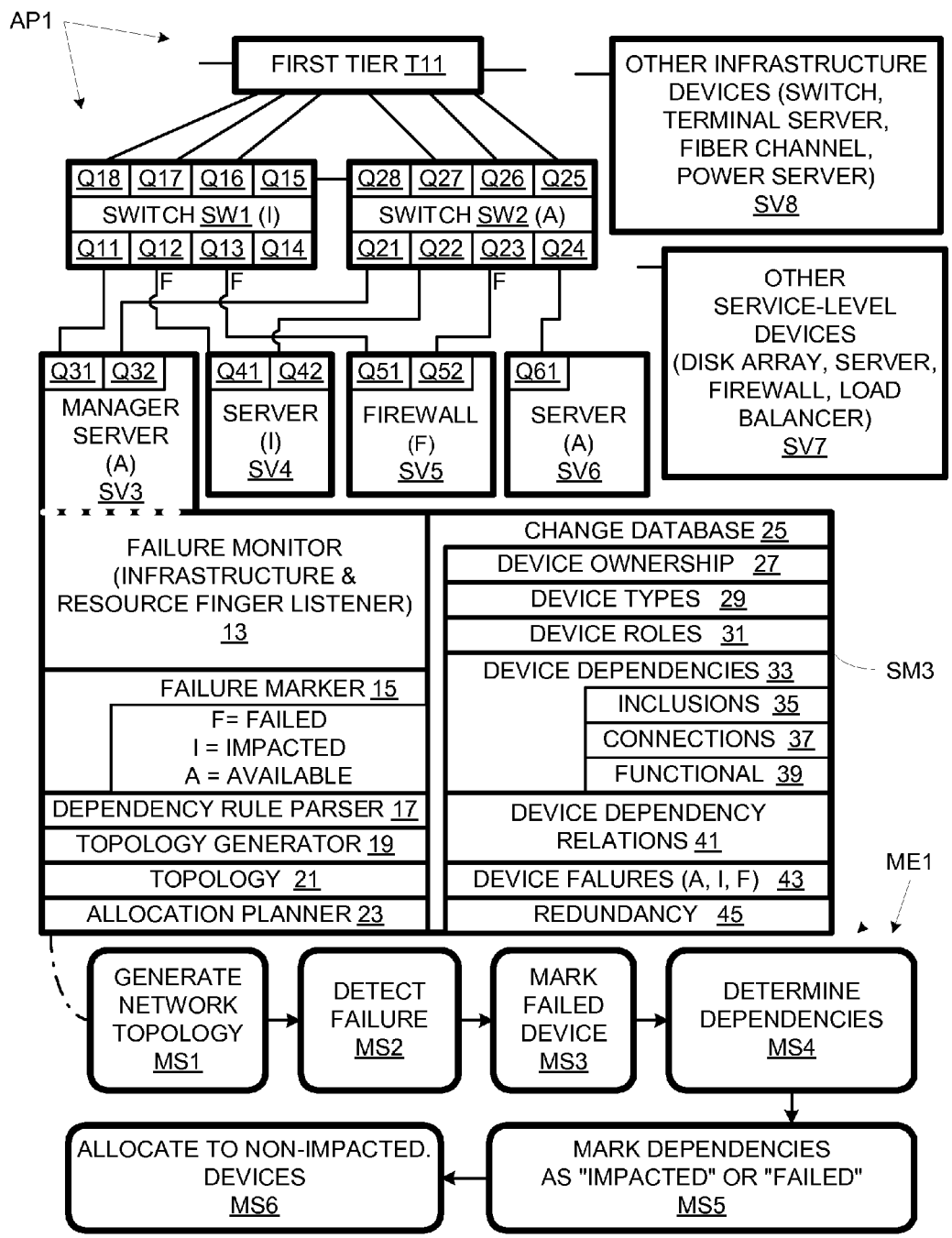
FIG. 3 is a combination schematic diagram of a computer system and a flow chart of a method implemented in that computer system in accordance with embodiments of the invention.

The portion of data center AP1 shown in FIG. 3 includes first tier switches T11, second tier switches SW1 and SW2, severs SV3-SV6, other service level devices SV7 including servers, firewalls, load balancers, and other infrastructure devices, and SV8, including switches, terminal servers, fiber channel, and power servers. Switch SW1 is shown with eight ports Q11-Q18, and switch SW2 is shown with eight ports Q21-Q28. In practice, switches can have many more ports.

Manager server SV3 has two network ports Q31 and Q32 respectively connected to switch ports Q11 and Q21 for redundancy. Customer server SV4 has two ports Q41 and Q42 respectively connected to switch ports Q12 and Q22. Firewall server SV5 has two network ports Q51 and Q52 respectively connected to switch ports Q13 and Q23. Customer server SV6 has one network port coupled to switch port Q24. Service level devices SV7 and infrastructure devices SV8 all have connection ports as appropriate for their functions.

Manager server SV3 includes software for managing data center AP1. Failure monitor 13, also known as an infrastructure and resource finger listener, periodically sends requests to resource and infrastructure devices in data center AP1. Some devices can report their own failures or failures of their components to failure monitor 13. In other cases, failures are determined by lack of responses. A failure marker 15 marks devices as "available", "impacted" or "failed", along with additional indications and comments as appropriate for planning purposes. A dependency rule parser 17 analyzes dependency data to determine which devices are impacted and how. Topology generator 19 uses the dependency analyses provided by dependency rule parser 17 to generate and update a data center topology 21. An allocation planner 23 plans allocations of resources to workloads based in part of topology and failure data.

Change database 25 provides characterizations for all resource and infrastructure devices of data center AP1. The characterizations include "device ownership" 27, "device types" 29, "device roles" 31, "device dependencies" 33, "device dependency relations" 41, "device failure status" 43, and "redundancy" 45. "Device ownership" 27 refers to the customer or other entity to which a resource device is assigned; ownership is not listed for infrastructure devices. "Device types" 29 specifies servers, switches, power server, fiber channel, disk array, etc. "Device roles" 31 is a field that depends on the device type. For a switch, tier is listed. For a server, it can be general (no dependencies issue from it), firewall, load-balancer, terminal server, etc.

"Device dependencies" 33 lists all devices that have a direct dependency relationship for a device. For each dependency, a type is listed as either an inclusion type 35, a connection type 37, or a functional type 39. "Inclusion" means that a failed component is part of an incorporating device that may still be partially functional. For example, if a network port fails, an incorporating switch or server can be impacted. If a switch fails, its ports are impacted. Connection type dependencies involve network (e.g., Ethernet, SAN) connections. If a port fails, the port on the other side of the connection is impacted. In this case, the device incorporating the impacted port is also impacted via an inclusion dependency. A functional dependency is a dependency that is based on the role of a device. For example, a resource server can be functionally dependent on a terminal server, a firewall, or a load balancer, despite the lack of a direct connection.

For each device dependency there is a relationship, either parent, child, or sibling. In an inclusion relationship, the component is the parent and the incorporating device is the child. In a connection relationship, the parent is the device higher in the hierarchy, e.g., a port on a first tier switch is the parent in a connection with a port on a $2^{nd}$ tier switch. In a functional relationship, the device providing the service is the parent, while the device receiving the service is the child. For example, a firewall is a parent to a resource server protected by the firewall. A sibling relationship applies mainly to connection type relationships, e.g., between switch ports at the same level a hierarchy.

Database 25 lists device failure status, e.g., available, impacted, or failed. The present embodiment uses comments to distinguish different failure and impact types. In other embodiments, other labels and categories are used.

"Redundancy" 45 indicates the required (e.g., by lease agreement or standard practices) and actual redundancy available to an impacted device. The redundancy fields are primarily intended for "impacted" yet fully functioning devices. If sufficient redundancy remains for an impacted device, it may be retained in service and even used as an allocation target.

For example, a customer may require a resource server with redundant network connections. Server SV4 meets this requirement, and so is assigned to the customer. If switch port Q12 fails, server SV4 still has a network connection, but has lost redundancy of that connection. In this circumstance, port Q41 is marked impacted as a result of a connection dependency from switch port Q12; no redundancy is marked for switch port Q41 since it has only one network connection. Server SV4 is marked "impacted" as a result of an inclusion dependency on port Q41. Server SV4 is marked as having a required redundancy of "2" (will remain functional with one failure), and an actual redundancy rating of "1" (functional but no redundancy) for this network connection.

In this impacted condition, two-port server SV4 may be as capable of non-impacted one-port server SV6. However, since server SV6 is not impacted, it remains fully available for allocation planning. Of course, allocation planner 23 can determine from database 25 that server SV6 has only one network connection and will not assign it to a customer or workload requiring a redundant network connection. The impacted status of server SV4 on the other hand, is an impediment to its use as an allocation target. If better alternatives are available, it will be withheld from the pool of allocation targets. If better alternatives are not available, it can be used as a one-port server for planning purposes.

In another scenario, if switch port Q13 fails, port Q51 of firewall server SV5 is impacted via a connection dependency, and firewall sever SV5 is impacted in turn by an inclusion dependency. All servers relying on firewall SV5 are also impacted via a functional dependency. Impacted firewall server SV5, in this scenario, is marked with a "2" required redundancy and a "1" actual redundancy. If, then, switch port Q23 fails, the required redundancy for firewall server SV5 is still two, but the actual redundancy is marked "0", meaning "no redundancy and not functional". Devices depending on firewall server SV5 for network protection are impacted more severely in the event of a loss of functionality due to two failures than they are when only one network connection is lost. Comments can be used to distinguish the severity of consequences for impacted devices, e.g., resource servers relying on firewall server SV5.

Method ME1, flow-charted in FIG. 2, is implemented in data center AP1. At method segment MS1, topology generator 19 generates or updates topology 21. To this end, topology generator 19 accesses database 25 to determine and characterize direct dependencies.

Indirect dependencies are traced by following child relationships. The dependency topology 21 can involve inclusion, connection, and functional relationships. In alternative embodiment, separate topologies are generated for different dependency types.

Figure 4:
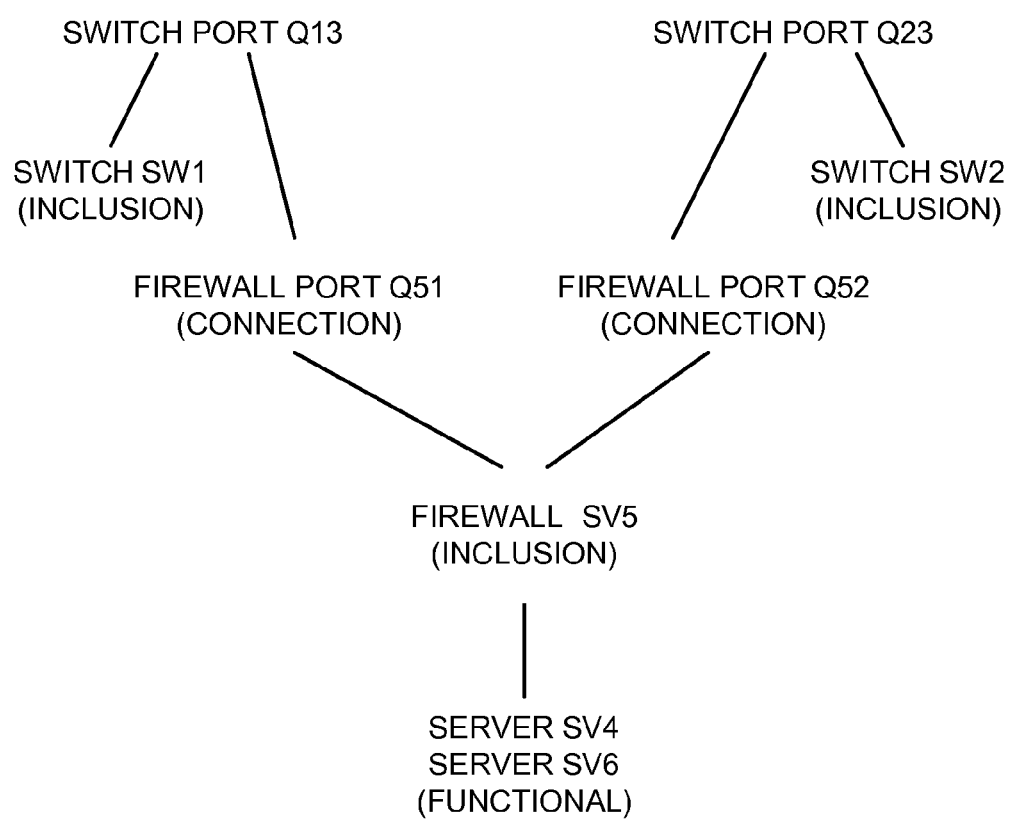
FIG. 4 is another portion of the topology of FIG. 2.

A portion of topology 21 is shown in FIG. 4. This portion focuses on firewall server SV5. It has an inclusion relationship with its two network interface cards or ports Q51 and Q52. Each of these has a respective connection relationship with a respective switch port Q13 and Q23. Each switch port has a parental inclusion relationship with the respective including switch SW1 and SW2. Firewall SV5 is set up to protect servers SV4 and SV6, which thus have child functional dependencies on firewall SV5. From topology 21, it is apparent that servers SV4 and SV6 will be impacted if either switch port Q13 or Q23 fails. In this case, for example, a failure of switch port Q13 will increase the risk that severs SV4 and SV6 will lose firewall protection.

When a device failure occurs, it is detected at method segment MS2. In some cases, a device can report its own failure, or an incorporating device can report a failed component. In other cases, repeated failures to receive responses to queries by failure monitor 13 can lead to a determination of a failure. If only one device fails, it is marked "failed" at method segment MS3. If more than one device has recently failed, method ME1 can complete method segment MS4 before determining which device is subject to a physical failure, and which device appears to have failed because of a dependency.

Method segment MS4 involves determining dependencies of a device detected as having failed at method segment MS2. If there is only one failed device, this involves tracing all child and sibling dependencies from the failed device. This means tracing down topology 21 inclusion, connection, and functional dependencies to devices such as resource servers that have no dependents. All of these devices are marked "impacted".

If two or more devices are detected as having failed at method segment MS2, there is the possibility that one or more may still be functional and appear to have failed only because of a dependency on another device that has actually failed. For example, a server may be inaccessible due to a failure of the only switch port connected to the terminal server. If topology 21 indicates a device that is detected as having failed could appear failed because of its dependency on another device that has failed, it is marked "impacted" rather than failed. Other devices depending from the failed device are marked as impacted as described above.

Once devices are marked as failed or impacted in database 25, subsequent planning can take the new device statuses into account. Failed devices are targeted for repair or decommissioning; of course, they are avoided as targets for future workload allocations until repaired. To the extent possible, impacted devices are avoided in favor of "available" devices as allocation targets at method segment MS6. Method segment MS6 involves planning by allocation planner 23, and implementation, e.g., via terminal servers TS1-3, in FIG. 1.

A "computer" is a machine that manipulates data in accordance with instructions. A "server" is a computer that provides service, e.g., serves web pages to or responds to database queries to other computers. A "terminal server" is a computer with human interface devices; in the present context, the interface is used to allow a human administrator to manage other servers. "Network infrastructure" refers to devices, such as switches, other than servers that handle inter-device communications; in the present context device is a device.

If a first device provides a service to a second device, the two have a dependency relationship. If the dependency is reciprocal, the relationship is a "sibling" relationship. Typically, sibling relationships are between devices of the same type, e.g., a pair of switches. If the relationship is hierarchical, the device providing the service is the "parent" and the device receiving the service is the "child".

All dependency relationships are "functional" in a general sense. However, herein, unless otherwise indicated by context, "functional dependencies" are those that are not "inclusion" relationships or "connection relationships". In an inclusion relationship, one device incorporates another device. For example, a switch device includes switch port devices. This relationship is termed an "inclusion" relationship herein. In an inclusion relationship, the including device is the "child" and the included device is the "parent".

In a connection relationship, one device communicates with the other over a network or peer-to-peer connection. For example, a switch port can connect to a network interface card of a server. Typically, connections are arranged hierarchically. In a connection relationship, the device higher in the hierarchy is the parent. If two connected devices are at the same level of the hierarchy, there is a sibling relationship.

"Failure" indicates the functionality of a device is lost due to some problem with the device itself. "Impacted" indicates that functionality of a device is lost, impaired, or put at increased risk due to the failure of another device.

A "firewall" is an information technology (IT) security device that is configured to permit, deny, or proxy data connections set and configured by the organization's security policy. A firewall's basic task is to control traffic between computer networks with different zones of trust. A "load balancer" is an IT device that evenly distributes work between servers. A "power server" is a device that distributes power to other devices to match their demands. A "disk array" is a storage media consisting of a (typically redundant) array of magnetic disks. A many-to-many connection between servers and disk arrays can be managed using a storage array network, which can include fiber channel network technology.

A "program" is an ordered series of computer-executable instructions. As used herein, a "program" is inherently tangibly embodied in computer-readable media. A "server" is a computer that provides services.

"Computer-readable media" refers to media that can be accessed by a computer and includes volatile and nonvolatile, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules or other data.

"Computer storage media" encompasses, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer.

"Communication media" encompasses computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of "computer-readable media".

Herein, "allocation" involves matching workloads to resources, e.g., software programs to servers. Herein, an allocation planner gives a higher priority to a first resource than to another if, all else being equal, it allocates a workload to the first resource. Thus, in the present context, an allocation planner will assign a workload to a non-impacted server instead of an impacted server, even though the capabilities of the two servers are the same. In some cases, some overriding consideration might result in an allocation of a workload to an impacted server instead of a non-impacted server. E.g., where the workload is already running on the impacted server or where an impacted server is more capable than any non-impacted server that is not otherwise occupied.

Alternative embodiments use different labels and to distinguish devices that have actually failed completely, actually failed partially, appear to have failed completely due to a dependency, and appear to have failed partially due to a dependency, and devices that appear to be functioning properly but are impacted by a failure of a device on which is depends. In addition, some embodiments limit impacted designations when sufficient redundancy remains despite a failure. For example, if one of three connections fails, and redundant connections remain, some embodiments do not mark the redundantly connected device as "impacted". These and other variations upon and modification to the illustrated embodiments are provided for by the present invention, the scope of which is defined by the following claims.

What is claimed is:

1. A method comprising:
   detecting a failure of a first device in a computer system;
   identifying impacted and non-impacted devices of said computer system, said impacted devices being impacted by said failure, said non-impacted devices being less impacted as a group by said failure than said impacted devices as a group; and
   assigning workloads to devices giving priority to said non-impacted devices over said impacted devices.

2. A method as recited in claim 1 wherein said failure impairs the manageability of one of said impacted devices.

3. A method as recited in claim 2 wherein said first device is a terminal server for managing resource servers, said terminal server being coupled to each of said resource serves via a switch, said resource servers being identified as impacted as they cannot be managed by said terminal server given its failed status.

4. A method as recited in claim 1 further comprising generating a dependency topology from a change database describing said system, said identifying involving tracing dependency relationships to identify devices that are indirectly impacted by said failure.

5. A method as recited in claim 1 wherein said identifying involves a determination that an impacted device is connected to said first device or to another device that is impacted by the failure of said first device.

6. A method as recited in claim 1 wherein said identifying involves a determination that an impacted device includes said first device.

7. A method as recited in claim 1 wherein said identifying involves a determination that an impacted device is functionally dependent on said first device.

8. A computer system comprising:
   resource servers for rum user workloads;
   management servers for managing said resource servers;
   network infrastructure devices for managing communications among said management and resource servers;
   a change database in computer-readable storage media indicating direct dependency relationships of said resource servers on said network infrastructure devices and said management servers;

a computer executable failure monitor in computer-readable media for detecting a failure of one of said infrastructure devices or said management devices; and a failure marker for updating said database to indicate which of said resource servers is impacted by said failure.

9. A computer system as recited in claim 8 wherein at least one of said resource servers is impacted in that it is no longer functional.

10. A computer system as recited in claim 8 wherein at least one of said resource servers is impacted in that its manageability is impaired or lost due to said failure.

11. A computer system as recited in claim 8 wherein a set of said management servers allocates workloads to said resource servers, said management servers giving priority to servers not impacted by said failure over servers that are impacted by said failure.

12. Computer-readable storage media comprising:

a computer-executable failure monitor for detecting a failure of a device in a computer system;

a computer-executable database for indicating direct dependency relationships between devices of said computer system so that devices directly impacted by said failure can be identified;

a computer-executable topology generator for generating a dependency topology of said system from said database to identify devices indirectly impacted by said failure; and a computer executable failure marker for updating said database to indicate which of said devices are impacted by said failure.

13. Computer-readable storage media as recited in claim 12 wherein said direct dependency relationship includes inclusion relationships, connection relationships, and functional relationships.

14. Computer-readable storage media as recited in claim 12 further comprising an allocation planner for planning allocation of workloads to said devices, said allocation planner giving priority to devices not impacted by said failure over devices impacted by said failure.

15. Computer-readable storage media as recited in claim 12 wherein said topology indicates that a resource server is impacted by a failure of a management server.

16. Computer-readable storage media as recited in claim 12 wherein said database distinguishes between parent, child, and sibling dependency relationships.

* * * * *

UNITED STATES PATENT AND TRADEMARK OFFICE
CERTIFICATE OF CORRECTION

| | | |
|---|---|---|
| PATENT NO. | : 7,711,980 B1 | Page 1 of 1 |
| APPLICATION NO. | : 11/751789 | |
| DATED | : May 4, 2010 | |
| INVENTOR(S) | : Samuel L. Scarpello, Jr. et al. | |

It is certified that error appears in the above-identified patent and that said Letters Patent is hereby corrected as shown below:

In column 8, line 62, in Claim 8, delete "rum" and insert -- running --, therefor.

Signed and Sealed this

Ninth Day of November, 2010

David J. Kappos
*Director of the United States Patent and Trademark Office*